US006816678B2

(12) United States Patent
Prigent et al.

(10) Patent No.: US 6,816,678 B2
(45) Date of Patent: Nov. 9, 2004

(54) METHOD FOR OBTAINING A SENSITOMETRIC CONTROL PATCH WITH EXPOSURE GRADIENT AND PHOTOGRAPHIC ELEMENT COMPRISING SUCH A CONTROL PATCH

(75) Inventors: Thierry Prigent, Buxy (FR); Michel M. Lemoine, Chalon sur Saone (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/383,008

(22) Filed: Mar. 6, 2003

(65) Prior Publication Data

US 2003/0170017 A1 Sep. 11, 2003

(30) Foreign Application Priority Data

Mar. 7, 2002 (FR) ........................................... 02 02861

(51) Int. Cl.[7] ................................................ G03B 17/24
(52) U.S. Cl. ....................................... 396/311; 396/315
(58) Field of Search ................................ 396/311, 315, 396/318, 569, 570, 578

(56) References Cited

U.S. PATENT DOCUMENTS 3,718,074 A 2/1973 Davis
4,757,334 A * 7/1988 Volent ......................... 355/27
4,977,521 A 12/1990 Kaplan
5,309,256 A 5/1994 Takada et al.
5,563,717 A 10/1996 Koeng et al.
5,649,260 A * 7/1997 Wheeler et al. ............ 396/569
5,667,944 A 9/1997 Reem et al.
6,280,914 B1 8/2001 Keech et al.
6,284,445 B1 9/2001 Keech et al.

FOREIGN PATENT DOCUMENTS

DE 26 32 715 1/1978

* cited by examiner

*Primary Examiner*—David Gray
*Assistant Examiner*—Arthur A Smith
(74) *Attorney, Agent, or Firm*—David A. Novais

(57) ABSTRACT

The present invention is in the photographic field, and is used to measure sensitometric characteristics of a photographic element. The present invention relates more particularly to a method that enables the production of a sensitometric control patch with exposure gradient, placed on a photographic element, and enables the measurement of the sensitometric characteristics of the photographic element. The sensitometric control patch is produced so as to obtain on the exposed photographic film strip, a single sensitometric control comprising a gradient of exposure areas, and enables all the sensitometric characteristics of the film to be obtained. The sensitometric control patch is produced from the nominal sensitometric characteristics of the film, and the instantaneous speed of relative movement of the film in front of the light energy source. The present invention has its application in the photography field and in particular the motion picture field.

12 Claims, 3 Drawing Sheets

METHOD FOR OBTAINING A SENSITOMETRIC CONTROL PATCH WITH EXPOSURE GRADIENT AND PHOTOGRAPHIC ELEMENT COMPRISING SUCH A CONTROL PATCH

This is a U.S. original application which claims priority on French patent application No. 0202861 filed Mar. 7, 2002.

FIELD OF THE INVENTION

The present invention is in the photographic field, and is used to measure the sensitometric characteristics of a photographic element. The present invention relates more particularly to the production of a sensitometric control patch with exposure gradient which is placed on a photographic element and enables the measurement of the sensitometric data of the photographic element.

BACKGROUND OF THE INVENTION

In the photographic field, it is important to control the entire chain of use and processing of a photographic film. In this field, the use of sensitometric control patches is known to those skilled in the art. The sensitometric control patches of a photographic element (film or photo paper) comprise a set of sensitometric data that enable the photographic element to be calibrated against preset nominal values. From each of these control patches, the sensitometric curve specific to the photographic element is thus reproduced. The photographic element is, for example, a film strip or photographic paper. The response of a photographic film to light exposure varies according to, for example, its manufacturing process, the period and conditions of its storage, etc.

The photographic processing chain can include "analog" operations of chemical development type, or digital operations. Productivity constraints require fast adjustment of apparatus setting parameters, like for example, a picture-taking camera or a digitizer (scanner), according to the sensitometric response specific to a film strip used, for example, in the recording camera. So it is particularly useful to know the sensitometric characteristics (optical densities) specific to the film strip, and to integrate them on-line in the apparatus used (camera, digitizer), to adapt the settings of the apparatus at the same time as the film is used (exposure, digitization). The targeted objective is to reproduce for the final customer images of an initial scene, having good reproduction quality without losing time. Therefore, and in relation to the medium or photographic element used, one means known to those skilled in the art is to reconstitute the sensitometric curve specific to this photographic element, using sensitometric control patches specific to the photographic element.

U.S. Pat. No. 6,284,445 describes a photographic element and a method that enables the area occupied by a plurality of sensitometric control patches to be optimized on the photographic element. The method also enables measurement of the sensitometric characteristics of the photographic element to be controlled, using a particular layout of the sensitometric control patches on the element.

U.S. Pat. No. 3,718,074 describes a camera that includes a device that enables the sensitometric control patches incorporated in the film strip used in the camera to be exposed. The means described in this patent are cumbersome.

U.S. Pat. No. 5,563,717 describes a particular method to produce a plurality of sensitometric control patches of constant width and different exposure levels, on a photographic element, by using a minimum surface area of the photographic element. The photographic element is, for example, a 35 mm photo film. U.S. Pat. No. 5,563,717 enables, for example, the dimensions of the means as described in U.S. Pat. No. 3,718,074 to be optimized.

U.S. Pat. No. 5,667,944 describes a method that enables corrected photographic images to be obtained taking into account the actual optical density values of the negative film strip used to record the latent image originally recorded. The described method comprises forming at least two reference sensitometric control patches having different exposure levels on the photographic film strip.

Patent Application DE 26,32,715 describes a correction method for color photographic films that uses three sensitometric control patches of different exposure levels on a film. The sensitometric control patches are placed between the perforations and outside the individual image locations on the film. The differences between the actual values of the sensitometric characteristics read of these sensitometric control patches and their nominal values enable color and image errors to be corrected. Document DE 26,32,715 also describes a camera including an exposure system for sensitometric control patches that enables, at each exposure of an individual image, the automatic exposure of a sensitometric control patch, so that the individual image can be corrected later during copying or digital conversion.

Contrary to the image quality requirements, the technical constraints of speed (several tens of images a second) and dimensions (reduced dimensions and weight of equipment), entail using as few sensitometric control patches as possible. These constraints mean that the exposure, for example, of a sensitometric control patch for each image recorded in a camera, at a rate of 150 images a second, requires perfectly controlling the energy and the exposure time of the control patch that will be used for reference. The accuracy of the corresponding sensitometric measurements will be all the more difficult to obtain, because of the variability generated by the camera's electronic and/or mechanical elements, and the repetition of the exposures. Furthermore, even using advanced recording means, reading and saving the data for each of the sensitometic control patches requires a time incompatible with, for example, the running speed of the photographic elements.

SUMMARY OF THE INVENTION

The present invention is based on the fact of obtaining the optical density curve of a photographic element as a function of illumination, by the deconvolution (inverse convolution) of a unique sensitogram whose illumination function has been determined. The present invention relates more specifically to a photographic element that comprises:

a) a material support;

b) at least one photosensitive emulsions layer coated on the material support; and c) a calibrating member adapted to calibrate the photographic element, comprising a latent image of a unique reference sensitometric control patch, with the sensitometric control patch being formed in the photosensitive emulsion layer, and the sensitometric control patch comprising at least one exposure area gradient obtained from an exposure sequence of the photosensitive emulsion, the exposure sequence being produced according to preset exposure parameters and corresponding to the preset nominal values of the sensitometric characteristics of optical density of the at least one layer of the photographic element.

The present invention also relates to a method which enables a production on a photographic element, based on a source of light energy, of a unique sensitometric control patch, by moving the photographic element in relation to the light energy source. The method enables the transmission to the at least one photosensitive emulsion layer of the photographic element of a light pulse; the respective digital values of the emission instant, the intensity, and the duration of the emission of the light pulse being automatically computed according to the preset nominal values of the sensitometric optical density characteristics of the photographic element, and the values being automatically modified in time according to the instantaneous speed of the relative movement of the source of light energy in relation to the photographic element.

Compared with the means described in the prior art, the present invention has an advantage of only using a single sensitometric control patch per photographic element. This sensitometric control patch has the particularity of having non-uniform exposure levels. Compared with the prior art, the present invention has the advantage, by meeting the above-mentioned speed and dimensions constraints, of only requiring a single reference sensitometric control patch per photographic element to be calibrated. The surface area and the time of the exposure sequence of the sensitometric control patch are thus optimized. The advantage provided by the invention is thus significant, given the above-mentioned constraints of time, measurement accuracy, and dimensions.

Other characteristics will appear on reading the following description, with reference to the drawings of the various figures.

DETAILED DESCRIPTION OF THE INVENTION

The following description is a detailed description of the main embodiments of the invention, with reference to the drawings in which the same numerical references identify the same elements in each of the different figures.

The means described in the prior art comprising sensitometric control patches placed on a silver-based photographic element generally use several sensitometric control patches per photographic element. Inside a recording camera, the recording speed can vary, for example, from one to one hundred and fifty images a second, or even more, for certain special cameras. Consequently the exposure time (opening of the shutter) of an image location of a film strip running in a camera is often about several milliseconds.

Figure 6:
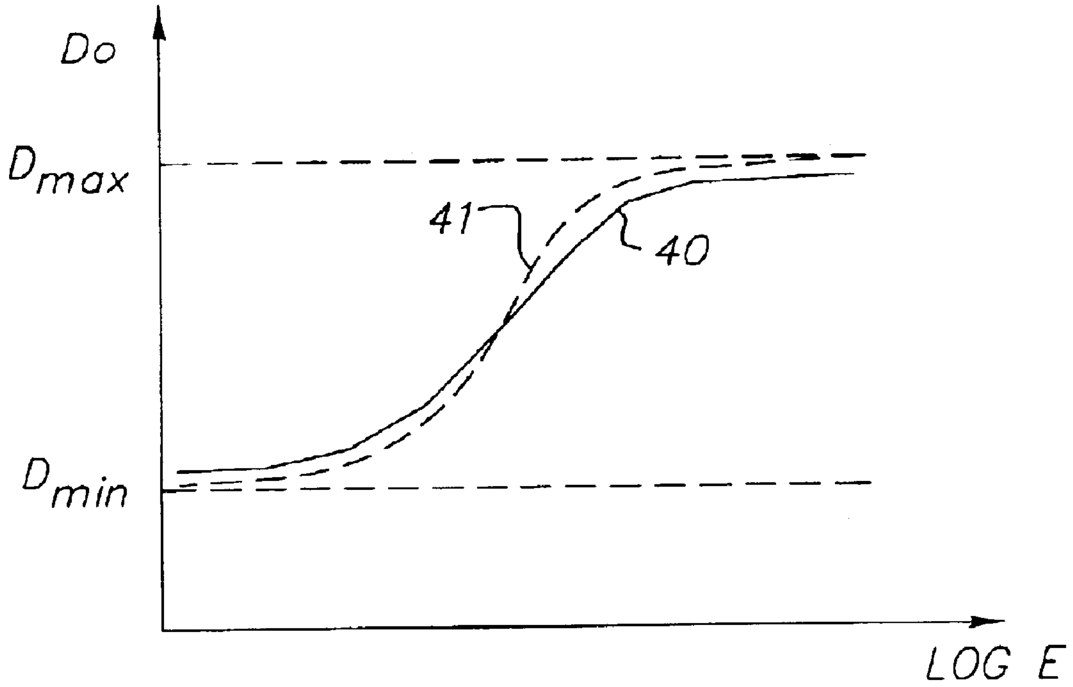
FIG. 6 represents a sensitometric curve of a photographic element.

To calibrate the film strip used against a reference film, according to FIG. 6, its sensitometric curve 40 is compared with a reference sensitometric curve 41. The sensitometric curve expresses the optical density values, between a minimum value Dmin and a maximum value Dmax, as a function of the exposure to light characterized by the illumination E. This illumination E, expressed by its logarithm (Log E), is represented on a logarithmic scale (FIG. 6). The sensitometric control patches of the film strip are used to measure its sensitometric characteristics. To calibrate the film strip used, for the same exposure sequence, the difference between the optical density values Do of the theoretical sensitometric curve 41 (reference film) and those of the sensitometric curve 40 of the film strip used, for example, in the camera are measured. Frequently, given the quality of the final images to be obtained (after processing), several sensitometric control patches are necessary for one film strip. For example, for a 35 mm photo film, 21 different points, i.e. 21 sensitometric control patches, are often used to measure the sensitometric exposures; the exposures are uniform for each point, and are given by the optical density values. The 21 values are saved and retrieved to form, by extrapolation, the sensitometric curve of the 35 mm film. Performing these multiple measurements raises problems, notably in terms of the overall dimensions of the exposure and/or measuring devices to be integrated into a recording camera for example.

Figure 1:
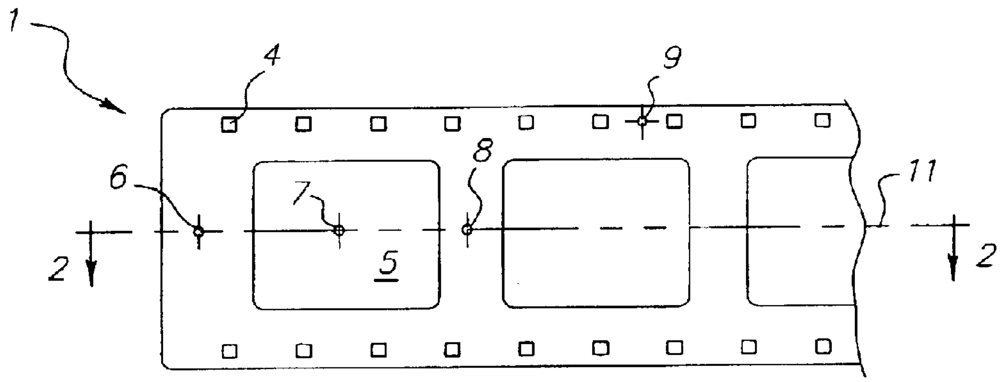
FIG. 1 diagrammatically represents an example of a photographic element comprising a unique sensitometric control patch according to the invention.
Figure 2:
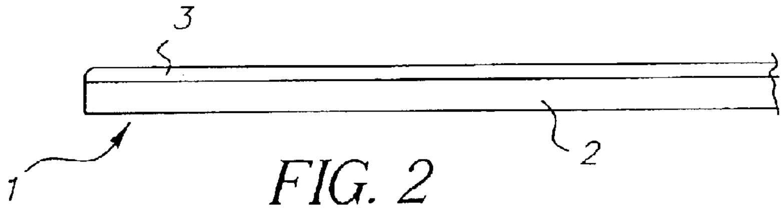
FIG. 2 represents a cross-section according to the line A—A of FIG. 1.

FIGS. 1 and 2 diagrammatically represent a photographic element 1 for implementing the invention. The photographic element 1 is, for example, a color photographic film strip used in a motion picture camera. But the photographic element 1 can also be a photographic paper type material support. The photographic element 1 comprises a material support 2 (FIG. 2) and a photosensitive emulsion layer 3 coated uniformly on the material support 2. The emulsion layer 3 generally comprises several emulsion sublayers that are successively coated on the support uniformly. In the case of a film strip, the photographic element comprises a plurality of perforations 4 regularly spaced along the edges of the film strip 1. These perforations 4 are for moving the film strip 1 in the camera. The size, positioning and number of perforations per unit length are, for example, listed in standard ISO 491 on cinema. The film strip 1 comprises locations 5 that enable, for example, latent images to be received after exposure to light of the strip 1 in the camera.

The present invention relates to a method for producing a sensitometric control patch 10, 20 (FIGS. 3,4), used as reference, on a photographic element 1. The sensitometric control patch has non-uniform exposure and is unique for the entire photographic element 1. These latter characteristics are beneficial for the invention. The sensitometric control patch is unique for the emulsion 3 of the photographic element 1 and means that a single control patch is exposed for the entire photographic element 1, or that if several control patches are exposed along the photographic element 1, all these control patches are identical. In the latter case, for which the control patches are redundant, two identical control patches can be used, if one of them is, for example, contaminated by dust causing a defect on this control patch.

Figure 5:
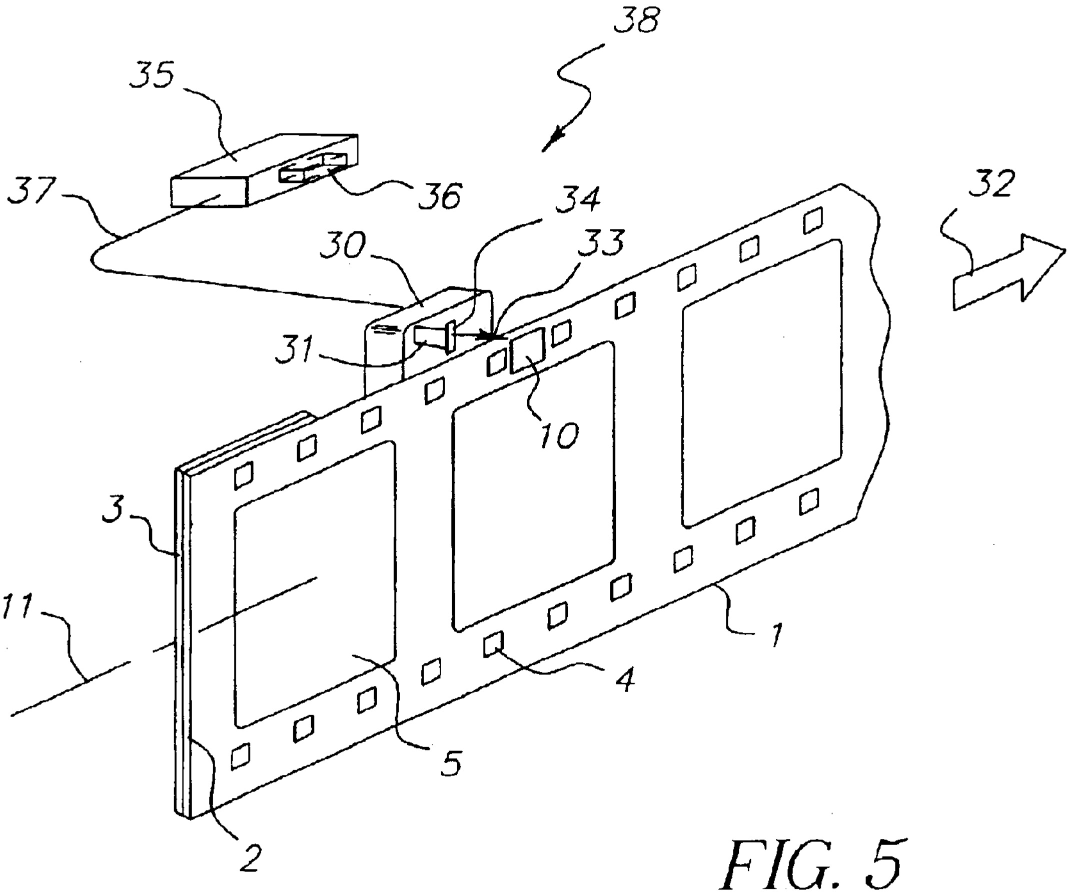
FIG. 5 diagrammatically represents and in perspective, the exposure system in relation to the photographic element.

According to FIG. 5, the method of the invention enables, from a light energy source 31 with calibrated wavelengths, a light pulse to be transmitted as a light beam 33 onto the photosensitive layer 3. The wavelength is calibrated; i.e. the spectral curves of the various wavelengths are known, for example, in the red, green and blue color regions. The corresponding wavelengths are assessed, for example, in nanometers. These wavelengths enable the colors of the various emulsion layers of the photographic element 1 to be exposed, for example, the primary colors red, green, and blue.

The light energy source 31 is channeled by a specific opening 34. This opening 34 can take various geometric shapes: circular, oblong, square, etc. Advantageously, the opening 34 has the shape of a narrow slot to let the light beam 33 be transmitted and focused onto the film strip 1. In a particular embodiment, the opening 34 has a rectangular slot shape. The opening 34 is, for example, a few tenths of millimeters wide and a few millimeters long. The light beam 33 is preferably directed perpendicularly to the exposed sensitive surface 3. The light energy source 31 is integral with a box 30. Advantageously, the light energy source comprises at least one light emitting diode (LED). The narrow output slot 34 of the light channel is located at a preferred distance from 0.1 mm to 1 mm from the emulsion layer 3. The distance between the opening 34 and the film strip 1 depends on the dynamic stability level of the film strip 1 when this runs, in the direction 32, in front of the box 30. This distance prevents any abrasion or deterioration of the film when running. When the film 1 is stopped (not running), contact is permissible between the film and the opening 34. The box 30 can, for example, enclose one or more mirrors mutually arranged to channel the light beam 33 at the output 34 of the box 30. The box 30 is interfaced, via an electric link 37, with a management module of exposure parameters 35.

In a preferred embodiment, the invention method enables the transmission of a calibrated light pulse when the element 1 moves in relation to the light energy source 31. Movement of the film strip 1 is shown in FIG. 5 by the arrow 32. Advantageously, this movement acts in one direction parallel to the principal axis 11 of the photographic element 1. The method and the exposure system 38 of the invention enable the transmission to the emulsion layer 3 of a light pulse whose characteristics are managed from the instructions of an algorithm implemented by a microprocessor 36 located inside the module 35. The characteristics of the light pulse are produced from three exposure parameters: the respective digital values giving the emission instant, the intensity and the duration for which the pulse is emitted. The algorithm enables the automatic computation of these three exposure parameters (emission instant, intensity, and emission duration) according to the preset nominal values of the sensitometric characteristics of the optical density of the photographic element 1. The algorithm also enables the automatic adjustment or modification in real time when running, of the three exposure parameters, according to the instantaneous speed giving the relative movement between the light energy source 31 and the photographic element 1.

Figure 4:
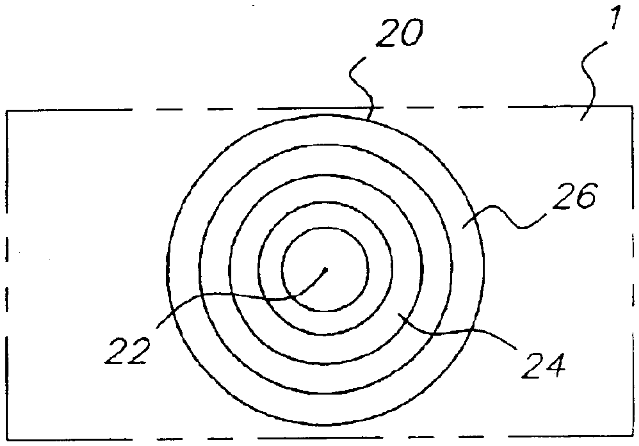
FIG. 4 represents a second embodiment of a sensitometric control patch according to the invention.

In a camera, the relative movement between the light energy source 31 and the photographic element 1 represents the running of the film in the camera. The management module 35 is itself servo connected to a measuring device (not shown in the figures) for the running speed. The algorithm implements digital value computations operated by a look up table (LUT). This LIJT supplies a plurality of values for the exposure parameters according to the input data for the nominal sensitometric characteristics of the photographic element 1, and for the instantaneous speed of relative movement of the light energy source 31 in relation to the photographic element 1 (running of the film in the direction 32). The nominal sensitometric characteristics correspond, for example, to the optical density values of a given film: 200 ISO, 800 ISO, etc. In a particular embodiment of the implementation of the invention, the light pulse is transmitted to the emulsion layer 3 when the instantaneous speed of the relative movement of the light energy source 31 in relation to the photographic element 1 is zero, i.e. there is no relative movement between the light energy source 31 and the photographic element 1. In this particular embodiment, a sensitometric control patch 20 is produced (FIG. 4).

The method of the invention enables a latent image of a sensitometric control patch 10, 20, exposed or formed on a photographic element 1 to be obtained. The sensitometric control patch 10, 20 is placed on the photographic element, either at a location 7 of a latent image 5, or at another location 6, 8, 9, outside the latent image 5 as shown in FIG. 1. The sensitometric control patch 10, 20 is unique for the photographic element 1, i.e. a single sensitometric control patch is enough to know all the sensitometric characteristics (optical densities, Dmin, Dmax) of the photographic element 1. The sensitometric control patch 10, 20 is exposed unevenly, i.e. the sensitometric control patch includes an exposure gradient produced according to an exposure sequence implemented using the method of the invention.

Figure 3:
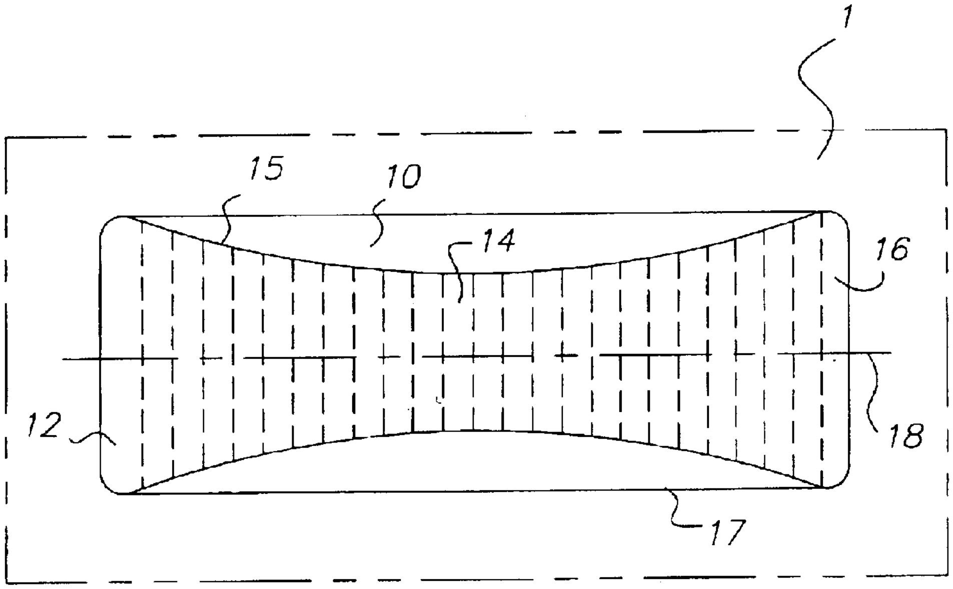
FIG. 3 represents a first preferred embodiment of a sensitometric control patch according to the invention.

FIG. 3 corresponds to a preferred embodiment of a sensitometric control patch 10 on the photographic element 1 when the instantaneous speed of the relative movement of the light energy source 31 in relation to the photographic element 1 is not zero, i.e. there is relative movement between the light energy source 31 and the photographic element 1. Production of the sensitometric control patch 10 is obtained by making, for example, the film strip 1 run in front of the light energy source 31. The method of the invention programs an exposure gradient ranging, for example, from a highly exposed area 12 to a weakly exposed area 16, going through a set of areas 14 that correspond to intermediate exposures. These exposures are different from one another. Advantageously, the area 12 corresponds to the maximum optical density Dmax. Advantageously, the area 16 corresponds to the minimum optical density Dmin. In an alternative of this embodiment, the method of the invention programs, for example, two gradients of exposure areas each placed successively, on about half the length of the sensitometric control patch 10 along its principal axis 18: a first gradient ranging, for example, from a highly exposed area (Dmax) to a weakly exposed area 14 (Dmin), then a second gradient ranging from the weakly exposed area 14 to a highly exposed area 16 (Dmax). The light energy also comprises a transversal gradient in a direction perpendicular to the axis 18. There is a cumulation and use of the gradients in the axis 18 and perpendicularly to the axis 18. According to FIG. 6, the sensitometric curve of the photographic element 1 is represented, for example, by the curve 40. This curve 40 is specific to the emulsion 3 of the photographic element 1 after the chemical development of the element. The "DlogE" sensitometric curve represents the optical density Do obtained as a function of the logarithmic function of the illumination light intensity E. The function "f" characterizing the optical density Do is written as the simple generic equation:

$$Do=f(\text{Log}\ (E)),\ \text{to log base 10;}$$

where Do represents the optical density, and E represents the illumination. The function f is a function characterizing the sensitometric curve, for example, of a photographic film strip. As the function f does not have a mathematical expression, it is determined by measurement. The illumination E of any point with coordinates (x, y) located on the photographic emulsion 3 and the measurement of the resulting optical density Do at the same point with coordinates (x, y), enable the determination, point by point and continuously, of the function f, and consequently the sensitometric curve 40 of the film 1. The relationship between Do, E and f is given by the equation:

$$Do(x,y)=f(\text{Log}(E(x,y)));$$

with f being the characteristic function of the sensitometric curve 40 of the photographic element 1 after development.

A photographic image or a sensitometric control patch recorded on film strip 1 represent variations of optical density. These optical density variations are the result, after development of the film, of the convolution of the light generating the image or the sensitometric control patch, by the transfer function f specific to the film strip 1. Knowledge of the light (exposure), i.e. the light energy of the light beam 33, and measurement of the resulting optical density Do enable the determination of the transfer function f for the light energy in question. By proceeding point by point, the characteristic f is determined in this way (point by point). This is point by point deconvolution (inverse convolution), which is, for example, used in the conventional case of a control patch strip with 21 ranges (including 21 sensitometric control patches). Similarly, when using a continuous exposure gradient as in the present invention, a continuous optical density gradient is obtained, and consequently continuous determination (or deconvolution) of the transfer function f. The algorithm of the invention method enables the computation of the various illumination levels E, which cover the exposure range enabling the sensitometric curve 40 of the film 1 to be formed, according to the instantaneous running speed of the film 1 and the physical characteristics of the system 38 (for example the electronics used, the size of slot 34).

Exposure of the emulsion 3 comprises a lighting spatial gradient, and consequently involves, according to the previous equation, another spatial gradient of the optical density corresponding to the emulsion 3. The method and system of the invention enable, by exposing a single sensitometric control patch 10, 20, the lighting gradient to scan a sufficiently wide lighting range, to obtain all the possible optical densities of the photographic element 1. The algorithm of the method of the invention enables the exposure parameters to be computed, and enables all the optical density values Do representative of the sensitometric curve 40 of the photographic element 1 to be measured from the exposure of a single sensitometric control patch 10,20. The sensitometric curve 40 gives the sensitometric response of the photographic element 1 to light energy, and this response can be compared with that of a curve 41 selected as reference.

Different shapes of sensitometric control patches are obtained according to the shape of the opening 34. These shapes depend on the type of exposure system 38 used. A broad range of shapes can be generated by controlling the power (wave form) of the light beam 33 and according to the type of exposure system 38 used. In a preferred embodiment, the light beam 33 is uneven over its width at the output 34 of the exposure system 38; in this case the sensitometric control patch obtained is a flat hyperboloid type 15. If, for example, the light beam 33 is even over its width at the output 34 of the exposure system 38, the sensitometric control patch obtained is of the rectangular type 17.

FIG. 4 shows another embodiment of a sensitometric control patch according to the invention. The light energy source 31 has a wave spectrum enabling the emission of a light pulse whose spatial intensity is not constant. This pulse is transmitted to the emulsion 3 of the photographic element 1 when the instantaneous speed of the relative movement of the light energy source 31 in relation to the photographic element 1 equals zero. The sensitometric control patch 20 produced is circular. The gradient of the exposure areas extends, for example, from a highly exposed central area 22 (Dmax) to a weakly exposed peripheral area 26 (Dmin), passing through differing intermediate exposure areas 24.

The described invention can of course be used in a recording camera or projector, like for example a motion picture camera, to produce a reference sensitometric control patch, on the film strip used in the camera. In a preferred embodiment of the implementation of the invention, the light energy source 31 is a light source independent from that used, for example, in the camera to expose the individual images in the locations 5.

While the invention has been described with reference to the preferred embodiments, it is clear that this application covers all modifications or variants that can be made and which correspond with the purpose of the invention. Accordingly, such embodiments are for illustration only and do not restrict the claimed protection.

The invention has been described in detail with particular reference to certain preferred embodiments thereof, but it will be understood that variations and modifications can be effected within the spirit and scope of the invention.

What is claimed is:

1. A photographic element comprising:

a) a material support;

b) at least one photosensitive emulsion layer coated on said material support; and c) a calibration member adapted to calibrate the photographic element, the calibration member comprising a latent image of a unique reference sensitometric control patch for the photographic element, said sensitometric control patch being formed in the photosensitive emulsion layer, and said sensitometric control patch comprising at least one continuous gradient of non-uniform exposure areas obtained from an exposure of the photosensitive emulsion layer to obtain a continuous optical density gradient sweeping all possible optical densities of the photographic element between a highly exposed area and a weakly exposed area, said exposure being produced according to preset exposure parameters and corresponding to preset nominal values of sensitometric characteristics of optical density Do of said at least one photosensitive emulsion layer, to obtain a continuous exposure gradient in at least one direction with respect to the principal axis of the sensitometric control patch.

2. The photographic element according to claim 1, wherein the material support is a photographic film strip comprising perforations and at least one image location.

3. The photographic element according to claim 2, wherein the sensitometric control patch is placed on the film strip at a location of a latent image.

4. The photographic element according to claim 2, wherein the sensitometric control patch is placed on the film strip at a location placed outside a latent image.

5. The photographic element according to claim 1, wherein the sensitometric control patch has a flat hyperboloid shape along its principal axis.

6. The photographic element according to claim 1, wherein the sensitometric control patch has a rectangular shape according to its principal axis.

7. The photographic element according to claim 1, wherein the sensitometric control patch has a circular shape.

8. A method for enabling a unique sensitometric control patch to be produced on a photographic element, from a light energy source, by moving said photographic element in relation to said light energy source, said method comprising the steps of transmitting transmitting a light pulse following a light beam to at least one layer of a photosensitive emulsion of the photographic element;

automatically computing respective digital values of an emission instant, an intensity, and a duration of an emission of said light pulse according to preset nominal values of sensitometric characteristics of optical density Do of said photographic element; and automatically modifying said values in time according to an instantaneous speed of relative movement of the light energy source in relation to the photographic element, so that the unique sensitometric control patch produced comprises at least one continuous gradient of non-uniform exposure areas, the sensitometric control patch having a continuous exposure gradient sweeping all possible optical densities of the photographic element between a highly exposed area and a weakly exposed area in at least one direction with respect to the principal axis of the sensitometric control patch.

9. The method according to claim 8, wherein the computed values of the emission instant, the intensity, and the duration of the emission of the light pulse, according to the instantaneous speed of relative movement of the light energy source in relation to the photographic element and according to the nominal sensitometric characteristics Do of said photographic element, are supplied by a look-up table.

10. The method according to claim 8, wherein the relative movement of the light energy source in relation to the photographic element is operated in a direction parallel to a principal axis of said photographic element.

11. The method according to claim 8, wherein spectral wavelengths of the light pulse enable the emulsion layers of the photographic element to be exposed.

12. The method according to claim 8, wherein the light pulse is transmitted to the at least one photosensitive emulsion layer when an instantaneous speed of relative movement of the light energy source in relation to the photographic element is zero.

* * * * *